United States Patent [19]

Kober et al.

[11] Patent Number: 4,669,493

[45] Date of Patent: Jun. 2, 1987

[54] SAFETY PRESSURE RELIEF

[75] Inventors: Drago Kober, Frechen-Bachem; Erich Martin, Wesseling, both of Fed. Rep. of Germany

[73] Assignee: Cryogas GmbH, Fed. Rep. of Germany

[21] Appl. No.: 722,314

[22] Filed: Apr. 11, 1985

[30] Foreign Application Priority Data

Apr. 14, 1984 [DE] Fed. Rep. of Germany ....... 3414294

[51] Int. Cl.⁴ ............................................ F16K 17/14
[52] U.S. Cl. ...................................... 137/73; 137/489
[58] Field of Search .................... 137/489, 489.3, 491, 137/492, 72, 73; 251/29

[56] References Cited

U.S. PATENT DOCUMENTS

| 2,592,043 | 4/1952 | Larson et al. | 251/29 |
| 3,583,432 | 6/1971 | Powell et al. | 137/489 |
| 3,811,471 | 4/1974 | Murase et al. | 137/489 |
| 4,099,538 | 7/1978 | Curtis | 137/73 |
| 4,328,672 | 5/1982 | Zumstein | 137/489 |

Primary Examiner—Martin P. Schwadron
Assistant Examiner—Sheri M. Novack
Attorney, Agent, or Firm—Steele, Gould & Fried

[57] ABSTRACT

A safety relief valve for liquified gas containers has dual pilot valves, one set to a given operating pressure and one adjustable. A main valve is responsive to the pilots, which are connected in parallel. The adjustable pilot is continuously adjustable and may be set below the operating pressure of the set pilot. The main valve has an inlet at the tank wall and a valve seat with a lateral outlet downstream thereof. The piston is faced at the inlet side by the gas pressure in the tank and on the control-pressure space side with a closing pressure adjusted by the pilots. If a given pressure in the tank is exceeded, the piston lifts from its valve seat, so that gas can flow from the inlet to the outlet. The second pilot valve can be provided with a thermal or other enabling means to initiate its operation when desired.

8 Claims, 3 Drawing Figures

SAFETY PRESSURE RELIEF

BACKGROUND OF THE INVENTION

1. Field of the Invention

This device refers to a pressure relief valve for tanks carrying liquified gas, and especially for liquified gas tankers.

2. Description of the Prior Art

It is known to provide a pilot valve with an adjusted set pressure to operate a main valve which has an inlet at the tank followed by a valve seat with a lateral gas outlet. A control pressure space in the main valve mechanism is connected for control by the pilot valve such that a movable main valve part, for example a piston, is positioned by the gas pressure from the tank, via the pilot valve. The pilot valve outlet is applied to an inlet side of the control pressure space, which space exerts a closing pressure on the main valve, by pressing the piston towards its valve seat. When the pressure in the tank exceeds the pressure set by the pilot valve, the main valve body is lifted from its seat, and opens the connection between inlet and outlet to vent gas.

Safety relief valves of this type are shown for example by German Patentschrift No. 27 31 804 and by illustrations of AGCO safety relief valves of the series 95. The main valve of this safety relief valve has a piston with an O-ring seat. The tank pressure is conducted by the pilot valve into a control pressure space (also known as "dome" space) on the upper side of the piston. The lower piston surface, which is directed toward the inlet of the main valve, is faced directly with tank pressure. The lower piston surface area is less than the upper one so that the piston is pushed down against its seat and the valve is normally closed. If the tank pressure increases and reaches a predetermined pressure, the pilot valve opens and vents the pressure space above the main piston. Thus the force acting on the main piston from below becomes comparatively greater and the main valve opens. If the tank pressure drops to the closing pressure of the pilot valve, the pilot valve closes and the tank pressure is applied to the upper piston surface so that the main valve closes as well.

According to the IMO Rule A 328 (IX) Chapter XV (XV.1), liquified gas tanks of liquified gas tankers are only allowed to be loaded up to 98% of the geometric tank volume at the opening pressure of the safety relief valve even if a reliquification plant or a device for stabilization of the pressure is provided. In the case of pressure tanks, for example full pressure or semi-pressure tankers, the maximum load filling can only be reached if immediately after loading, the saturation pressure has the same value as the opening pressure of the safety relief valve while loading the refrigerated liquified gas. If the saturation pressure immediately after loading for example is 1 bar only (e.g., butane at density=0.594) the maximum possible filling of 98% cannot be reached because according to IMO the tank must be loaded in such a way that with a pressure of 5.5 bar (e.g., butane at density-0.52) it would be filled to the maximum, i.e. 98%.

The IMO rules are intended to prevent overfilling of the tank in case of heating up of the load, for example in case of fire. The expansion caused by heat input when working normally, however, especially thermal radiation or heat conduction, is normally prevented by a reliquification plant. The restriction of the filling rate implies (according to the type of liquified gas) an unnecessary loss of up to 15%. In order to prevent this disadvantage a so-called auxiliary pilot is provided with the aforesaid safety relief valve of the AGCO Company series 95. This auxiliary pilot is temporaily applied to the primary pressure adjustment of the pilot valve. Like the primary pressure adjustment, the auxiliary pilot includes a spiral spring whose spring tension essentially determines the adjustment pressure of the pilot valve. By installing the corresponding auxiliary pilot, the pilot valve can be adapted to the physical parameters of the loading.

The solution with this known auxiliary pilot, however, is disadvantageous because it is difficult to handle. As operation of an auxiliary pilot is determined by the pressure of its spiral spring and the auxiliary is therefore only suitable for a very restricted pressure range, a graduated range of auxiliary pilots must be made available to cover the possible adjustment pressure choices between 1 bar and the admissible maximum pressure of the tank. Normally the auxiliary pilots of each tank in the tanker have to be changed when commencing loading; the new auxiliary pilots which are to be installed have to be chosen according to the saturation pressure of the specific liquified gas being loaded. As the auxiliary pilot is connected with the primary pressure adustment by several screws, special assembly works are necessary.

Various mistakes may occur when changing auxiliary pilots. An auxiliary pilot may be installed to effect operation at a wrong pressure value, due for example to a false reading of specifications. Little constituent particles, especially dirt, also may fall into the primary pressure adjustment during installation, changing its operating characteristics.

SUMMARY OF THE INVENTION

It is an object of the invention to avoid disadvantages of known safety relief valves and to improve on the known safety relief structure as mentioned above, in order to enable easy adjustment of the pilot valve without deviating from the rules. Starting with the known safety relief valve, this object is achieved by an additional, i.e., a second pilot valve, which is connected in parallel with the first pilot valve and which has a continuously-adjustable setting device for the adjustment pressure which can be operated by hand. The second pilot valve is adjustable over a range including pressure values below the set operating pressure of the first pilot valve.

In the case of this safety relief valve, the first pilot valve, i.e., the valve which is designed for the maximum admissible tank pressure, is not changed. Any risk of error or damage when assembling the auxiliary pilots to the pilot valve is excluded. By using the second paralleled pilot valve which is preferably adjustable in a continuous way within the entire pressure range between atmospheric pressure and the maximum allowed pressure of the tank, there is no necessity of storing, controlling and handling the different auxiliary pilots. The respective optimal pressure valve can be adjusted with the second pilot valve. One need not depend on the respective availability of the auxiliary pilots, or be satisfied with pilots whose adjustment pressure doesn't necessarily meet with the optimal adjustment pressure of the liquified gas to be loaded.

In place of a construction as a piston, the valve part may be designed as a diaphragm or as a bellows as well.

The continuously-manually-adjustable setting device can be equipped with an auxiliary power system, but works without auxiliary energy as well and simply uses the tank pressure. The adjustment device can directly handle the valve part of the second pilot valve, on the other hand this second pilot valve can be formed by a pressure gauge and switching device and a valve controlled by it.

With the preferred embodiment of the invention, the second pilot valve has a pressure gauge which indicates the current respective tank pressure and which in addition accomplishes a switching process at an adjustable pressure valve. With this embodiment, errors in reading are reduced and errors in transmitting and adjusting are eliminated. At the end point of the loading process the saturation pressure of the liquified gas can be read directly on the pressure gauge; the adjustment pressure of the second pilot valve can be set by means of the adjustable pressure switch of the pressure gauge without the least risk that the adjustment pressure is below the saturation pressure of the loaded cargo.

In another preferred embodiment, the second pilot valve is connected in series with a valve which opens automatically in case of increased temperature. In this way, the second pilot valve is enabled to control the main valve only when the valve equipped with a safety fuse opens due to destruction of the safety fuse. Normally, the second pilot valve has no influence on the main valve provided the safety fuse is in good condition. Therefore, according to the IMO rules Section 8.3, it becomes possible to eliminate restriction of loading as noted above. According to these rules in addition to a relinquification plant, a safety relief valve must be provided which is activated in case of fire and which operates at a lower pressure compared to that of the normal safety relief valve.

More advantages and characteristics of this device will be apparent from the following description of certain embodiments and examples, and from the appended claims.

BRIEF DESCRIPTION OF THE DRAWINGS

There are shown in the drawings the embodiments which are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
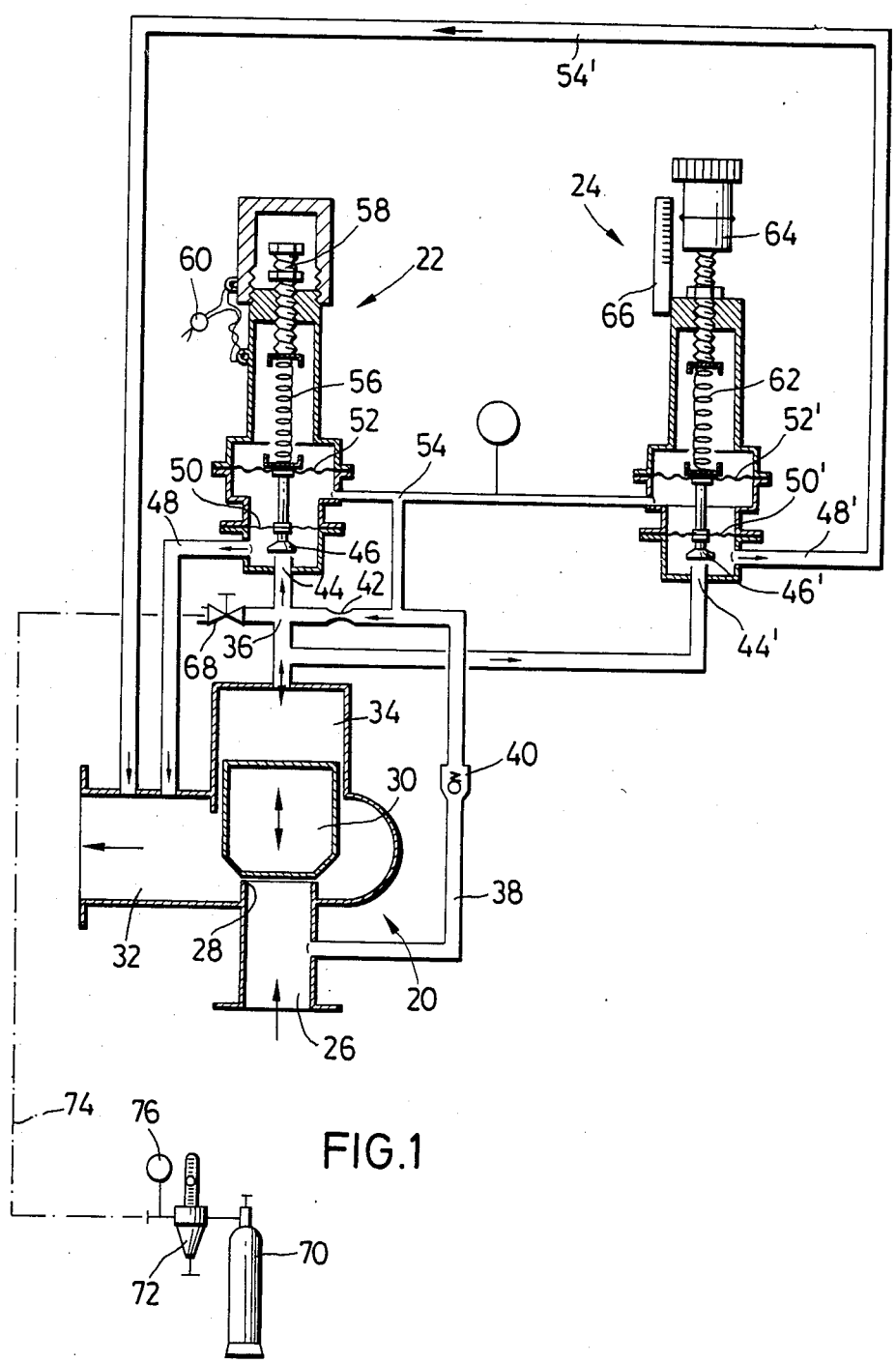
FIG. 1 is a schematic drawing of a safety relief valve according to the invention, with a main valve and two parallel pilot valves.

The safety relief valve for liquified gas tanks essentially consists of a main valve 20, a first, sealed pilot valve 22 and a second, continuously adjustable pilot valve 24. The two pilots, which are in parallel, are connected in series with and control independently the main valve 20. The main valve 20 has an inlet 26 through the tank wall and a valve seat 28 oriented towards an upper part. This valve seat receives a movable valve part, for example formed like a piston 30. This piston 30 is accordingly pressurized from below by the tank pressure through the inlet 26. Furthermore, the main valve has a lateral outlet 32, which communicates with the inlet 26 when the piston 30 is raised from its valve seat 28 to release gas for venting, reliquification or other processing. Above the piston 30, there is a control pressure space 34, also called "dome" space, which is connected to both pilot valves 22, 24 by a control line.

By means of an impulse line 38 in which a check-valve or non-return valve 40 and a restricted orifice 42 are arranged, the pressure space 34 and also the upper area of the piston 30 are connected to tank pressure from the inlet 26. The upper area of the piston is larger than the effective lower piston area faced to the inlet 26, therefore the main valve 20 is normally closed.

The main valve 20 opens whenever the pressure space 34 is vented more rapidly than it is refilled with gas from the inlet 26 via the restricted orifice 42. The flow from pressure space 34 to the external atmosphere is controlled via at least one of the two pilot valves 22, 24 which are both normally closed.

The pilot valves 22, 24 are shown schematically in order to clearly illustrates their respective functions. The actual design shapes, for example, are comparable to the above mentioned AGCO safety reief valves, series 95, the subject matter of which is hereby incorporated. The first pilot valve 22, as shown on the left in both figures, has an inlet 44 oriented downwards and having a valve seat. Normally, a widened-end valve part 46 sits tightly on this seat. An outlet 48 is connected to outlet 32 via downstream of the valve seat. Inlet 44 and outlet 48 are connected to a pressure space on the lower end of pilot valve 22, closed by a first diaphragm 50 at the top of the lower space. Above this first diaphragm there is an upper pressure space of pilot valve 22, which is closed at the top by a large second diaphragm 52 and is pressurized by means of a line 54 which is connected to the impulse line 38 between check valve 40 and orifice 42. The valve part 46 is connected to both diaphragms 50, 52 and at its upper end is biased downwards by a pressure spring 56. This is adjusted and set at a certain safe pressure by an adjusting device 58 and sealed thereafter against tampering or informal adjustment by seal 60.

Tank pressure is normally maintained in both pressure spaces of the first pilot valve 22. If this tank pressure is sufficient for compressing the pressure spring 56, then valve part 46 can lift from its seat, the consequence of which is the pressure relief of pressure space 34 of main valve 20, through the lower pressure space of pilot valve 22. The gas quantity then flowing directly through orifice 42 is not sufficient for the buildup of pressure. If the pressure decreases in pressure space 34, piston 30 is moved upwards so that the way from main inlet 26 to main outlet 32 is opened. The first pilot valve 22 eventually closes again, when the tank pressure is not sufficient any more to compress the pressure spring 56. Then pressure can build up again in pressure space 34, whereupon the main valve closes.

In the example as shown according to FIG. 1, and explaining the device very simply, the second pilot valve 24 is designed as far as possible in accordance with the first pilot valve 22. Corresponding reference numbers are shown (primed) for corresponding parts. Thus both inlets 44, 44', both outlets 48, 48' and both upper pressure spaces are connected to each other by flow lines. Instead of the firmly adjusted, sealed pressure spring 56 there is provided, however, a softer spiral spring 62, which can be adjusted manually by an adjusting spingle with handle, anywhere between normal atmospheric pressure, and when set at its effective maximum, the same set pressure as the first pilot valve 22. The adjusted pressure can be seen from scale 66.

A test and adjusting device is also shown in the figures. Pressurized gas such as nitrogen from a nitrogen bottle 70 is fed into the pilot line 36 by means of valve 68. The gas flowing out of the nitrogen bottle at first passes a reducing valve with flowmeter 72, then flows on line 74 to the valve 68. With help of a pressure gauge 76, the pressure in line 74 can be read.

Figure 2:
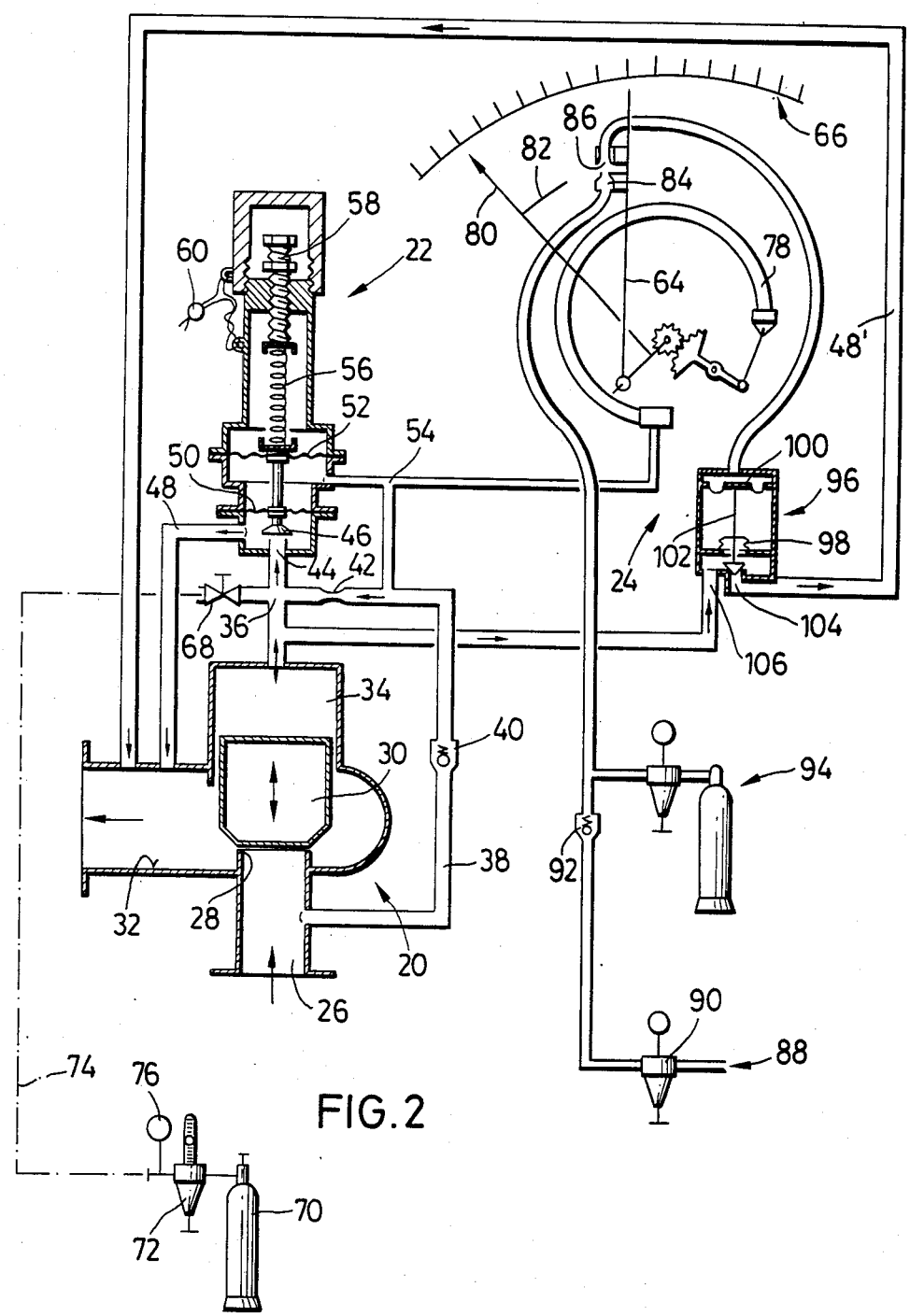
FIG. 2 is a schematic drawing of an alternative embodiment with another formation of the second pilot valve; and, FIG. 3 is a representation of yet another embodiment, with an additional valve connected in series with the second pilot valve to enable the second valve upon opening of a fuse.

In FIG. 2, an improved practical design for the construction of the second pilot valve 24 is shown. The other components are identical to FIG. 1. The tank pressure in impulse line 38 upstream of the orifice 42 can be read from a bendable spring formed as a Bourdon tube 78. The pressure indication is done in well-known manner with a pointer 80, to which is fitted switching plate 82. This switching plate is positioned between the two nozzles 84 and 86 and interrupts the gas flow between the nozzles, if pressure increases to a valve higher than the set point as represented in FIG. 2. The lower nozzle is a discharge nozzle 84 and is pressurized by means of an instrument air supply. This pressure air is fed from an unseen source at inlet 88, reduced in a pressure reducer 90 and afterwards passes the check valve 92. Above this non-return valve an emergency supply 94 consisting of a pressure gas bottle and a pressure reducing valve is maintained in case of failure of the instrument air supply.

The upper nozzle is a receiving port 86 turned towards the discharge nozzle 84, and is directly connected to the control pressure space of a control valve 96, which for its part acts like the second pilot valve 24, but is controlled by the just described pressure switch device rather than as in the example of FIG. 1.

The two nozzles 84, 86 are fixed on a setpoint adjustment device 64 formed as a pointer and adjustable by moving the pointer to any pressure value desired. The control valve 96 has also a lower, small diaphragm 98, constructed as a bellows 5, as well as a large upper diaphragm 100. Both diaphragms 98, 100 are connected to each other by a valve part 102, which in FIG. 2 closes an outlet 104 of the control valve 96. The control line 36 is comparable to the inlet 106 of control valve 96, the lower chamber of which is built very similar to the lower chamber of the first pilot valve 22.

With reference to FIG. 2, and other things being equal, if the pressure is raised in the impulse line 38 the pointer 80 moves further to the right. As pointer 80 advances, its switching plate 82 interrupts the gas flow between the two nozzles 84, 86. Therefore, the pressure in the upper control pressure space of control valve 96 is reduced. The pressure of control line 36 is then sufficient to lift the valve part 102 off its seat, opening the connection of control line 36 to the atmosphere. In this way, the processes already described with reference to FIG. 1 start running and the main valve 20 opens.

The version in FIG. 2 is only a preferred example. Other pressure switch devices with different arrangements as with switching plate 82 and nozzles 84, 96 are also possible.

Figure 3:
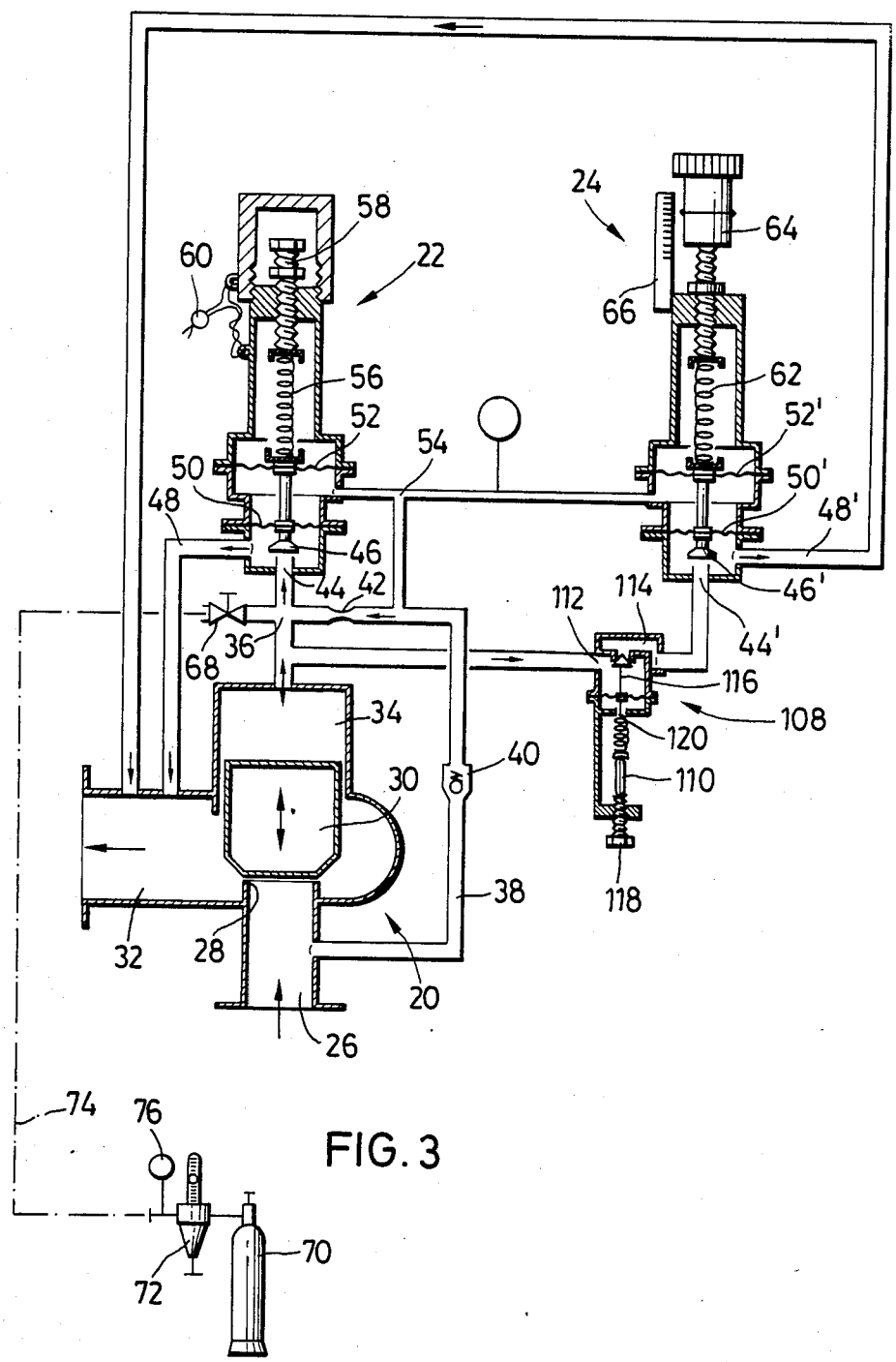

The example according to FIG. 3 corresponds to the embodiment of FIG. 1 with the exception, however, that an additional valve 108, which is normally closed due to the effect of a safety fuse 110, is inserted in the control line 36 leading to the second pilot valve 24. Because of this series arrangement the pressure in control line 36 can only be released through the second pilot valve 24 if the safety fuse 110 has been first destroyed by fire or other high temperatures. The additional valve 108 once opened by heat, connects the way to inlet 44' of the second pilot valve 24. Once the fuse 110 is destroyed second valve 24 is enabled and operation corresponds exactly to that of FIG. 1.

The additional valve 108 can also be connected after (that is, downstream of) the second pilot valve 24, between the outlet 48' of second valve 24 and the outlet 32. Furthermore, the additional valve 108 can be inserted in that part of the control line 36 leading to control valve 96 (as in the example of FIG. 2), with the same effect.

The additional valve 108 with safety fuse 110 is constructed in a well-known manner. The path from the inlet 112 to outlet 114 is normally closed by a valve part 116, which is mechanically pressed against its valve seat by means of the safety fuse 110. Sufficient seat pressure is applied by a bolt 118 so that the additional valve 108 is normally closed. The safety fuse 110 thereby transmits the adjusting pressure of bolt 118 to the valve part 116. The safety fuse 110 is a bar made of a material that for example has a melting point between 89 and 104 degrees centrigrade. In case of fire, the fuse materials melts, so that rigid connection between bolt 118 and valve part 116 is removed. A spring 120 then draws the valve part 116 back into open position, whereby flow through the additional valve 108 is allowed and second valve 24 is enabled.

Other constructions of the additional valve, the construction according to German Patentsschrift No. 27 31 804 for example, are possible too. In place of the safety fuse 110, other devices which are operable in response to temperature, distant control or manual operation can be used. If necessary, the other devices can be connected in addition to the safety fuse 110.

The effect of the additional valve 108 in the safety relief valve arrangement with the two pilots is that no gas is released due to short pressure peaks. Harmless short pressure peaks can occur during loading procedures or when sailing in heavy sea. In the sketches of FIGS. 1 and 2 the main valve 20 always opens when the second pilot valve 24 opens, even if only briefly. Thereby gas is vented to the outlet during any overpressure situation. Venting to the air in the usual course of procedures is not permitted at seaports and besides is a loss of cargo. By the additional valve 108, the second pilot valve 24 ceases to have that effect; the second pilot valve 24 only reacts when enabled, for example, in case of fire.

What is claimed is:
1. A safety pressure relief apparatus for a liquified-gas tank, comprising:
 a first pilot valve responsive to pressure in the tank, adjusted and fixed for operation at a predetermined opening pressure;
 a main valve operated by the first pilot value, the main valve having an inlet passage communicating with a tank, an outlet passage for venting gas, and a main valve seat and a main valve body movable against the seat to close a flow path between the inlet passage and the outlet passage, the main valve having a control chamber connected to an output of the first pilot valve, gas pressure in the control chamber urging the main valve body against the main valve seat; and, a second pilot valve connected in parallel to said first pilot valve, the second pilot valve having a continuously-adjustable setting device for operation over a range of selectable opening pressures, the second pilot valve being adjustable for operation at a lower pressure than the predetermined opening pressure of the first pilot valve; and, an additional valve having a safety fuse, the second pilot valve being connected in series with the additional valve, the additional valve being normally closed, and opening automatically after destruction of the safety fuse, to enable operation of the second pilot valve.

2. The safety relief valve according to claim 1, wherein the setting device of the second pilot valve is adjustable for operation over a range between atmospheric pressure and the pressure of the first, fixed pilot valve predetermined opening pressure.

3. The safety relief valve according to claim 1, wherein the second pilot valve has an indicator scale and pointer operative to indicate current tank pressure.

4. The safety relief valve according to claim 1, wherein the second pilot valve has a device for indicating current pressure and for setting an operating pressure of the second pilot valve.

5. A safety pressure relief apparatus for a liquified-gas tank, comprising:

a first pilot valve responsive to pressure in the tank, adjusted and fixed for operation at the admissible maximum pressure of the tank;

a main valve operated by the first pilot valve, the main valve having an inlet passage communicating with the tank, an outlet passage for venting gas, and a main valve seat and a main valve body movable against the seat to close a flow path between the inlet passage and the outlet passage, the main valve having a control chamber connected to an output of the first pilot valve, gas pressure in the control chamber urging the main valve body against the main valve seat; and, a second pilot valve connected in parallel to said first pilot valve, the second pilot valve having a continuously-adjustable setting device for operation over a range of selectable opening pressures, the setting device being adjustable for operation over a range between atmospheric pressure and the pressure of the first, fixed pilot valve admissible maximum pressure, whereby when the setting device is set according to the saturation pressure of a specific liquified gas being loaded, but not below the saturation pressure, the setting device operates responsive to the tank pressure, without requiring auxiliary energy.

6. The safety relief valve according to claim 5, further comprising an additional valve having a safety fuse, the second pilot valve being connected in series with the additional valve, the additional valve being normally closed, and opening automatically after destruction of the safety fuse, to enable operation of the second pilot valve.

7. The safety relief valve according to claim 5, wherein the second pilot valve has an indicator scale and pointer operative to indicate current tank pressure.

8. The safety relief valve according to claim 5, wherein the second pilot valve has a device for indicating current pressure and for setting an operating pressure of the second pilot valve.

* * * * *